United States Patent Office 2,996,509
Patented Aug. 15, 1961

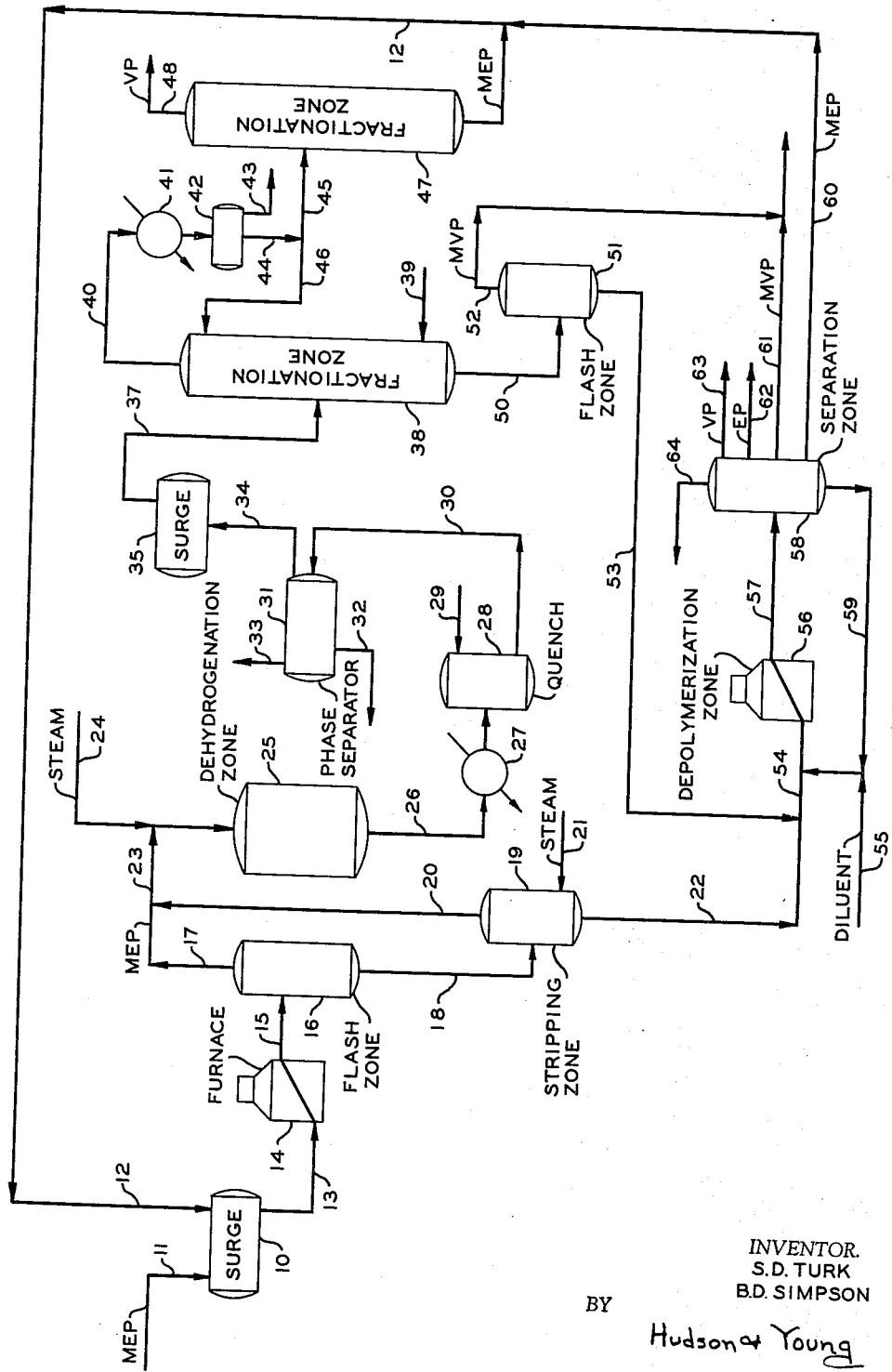

2,996,509
DEHYDROGENATION OF ALKYL PYRIDINES INCLUDING DEPOLYMERIZATION OF POLYMERS
Stanley D. Turk and Billy D. Simpson, Bartlesville, Okla., assignors to Phillips Petroleum Company, a corporation of Delaware
Filed July 7, 1959, Ser. No. 825,457
6 Claims. (Cl. 260—290)

This invention relates to a process for the production of heterocyclic nitrogen-containing bases of the pyridine, quinoline, and isoquinoline series and, more particularly, the invention relates to the depolymerization or pyrolysis of polymers of the polymerizable heterocyclic nitrogen-containing bases, such as polymers of 2-vinylpyridine and 5-vinylquinoline. In accordance with one aspect, this invention relates to a novel process for the production of pyridine, quinoline, and isoquinoline derivatives from polymers of alkenyl substituent pyridines, quinolines, and isoquinolines by pyrolysis. In accordance with another aspect, this invention relates to a depolymerization process for converting polymers having heterocyclic nitrogen-containing substituents to monomers. In accordance with another aspect, this invention relates to an improved process for the dehydrogenation of alkyl substituted heterocyclic nitrogen-containing compounds to alkenyl substituted heterocyclic nitrogen-containing compounds which form polymers during processing, said improvement comprising removing polymer formed during said dehydrogenation process, heating said polymer to an elevated temperature to convert the polymers to simple heterocyclic nitrogen base derivatives, and separating said derivatives, recovering the alkenyl substituted products, and returning dehydrogenatable derivatives to said dehydrogenation process to materially increase the yield of desired dehydrogenated heterocyclic nitrogen bases in said process.

The production of alkenylpyridines, especially vinylpyridines, has recently become of much industrial importance. Vinylpyridines can be prepared by condensation of formaldehyde with 2- and 4-methylpyridines or substituted derivatives to form the monomethylol compounds followed by dehydration of same to produce corresponding vinylpyridines or substituted vinylpyridines.

A more direct procedure is the direct catalytic dehydrogenation of the dehydrogenatable alkylpyridines to the corresponding alkenylpyridines. Thus, for example, 2-methyl-5-ethylpyridine can be efficiently dehydrogenated to produce the corresponding 2-methyl-5-vinylpyridine. This can be done, for example, by passing an admixture of from 2 to 15 weights of steam per weight of 2-methyl-5-ethylpyridine at a temperature within the range of 1,000 to 1,300° F., approximately atmospheric pressure, and a space velocity of 1 to 5 liquid volumes 2-methyl-5-ethylpyridine charge per volume of catalyst per hour, over a catalyst exemplified by one composed of 93 weight percent iron oxide, 5 percent chromium oxide and 2 percent potassium hydroxide, as described and claimed in further detail in U.S. Patent 2,769,811 of John E. Mahan, issued November 6, 1956. The dehydrogenation effluent contains, in addition to hydrogen, principally unchanged 2-methyl-5-ethylpyridine (MEP) and 2-methyl-5-vinylpyridine (MVP) product. Also present are small quantities of Pyridine
2-picoline
3-picoline
2,5-lutidine
3-ethylpyridine
3-vinylpyridine.

Processing of vinylpyridines contained in this or other mixtures presents many difficulties. These arise because of the great ease with which vinylpyridines, in particular, polymerize. In fact, solutions containing these alkenyl bases frequently contain some polymer, since in the absence of highly effective inhibitor, the monomers polymerize under ordinary conditions of storage. For many uses, it is desirable to remove the polymer, and the recovered polymers represent by-products. In accordance with the present invention, we have discovered a new and valuable use for such polymers which comprises depolymerizing said polymers at an elevated temperature to form simple pyridine derivatives.

Accordingly, an object of this invention is to provide a process for the production of heterocyclic nitrogen bases of the pyridine, quinoline, and isoquinoline series. Another object of this invention is to provide a process for the depolymerization of polymers prepared from polymerizable heterocyclic nitrogen-containing bases, such as the vinylpyridines and the vinylquinolines. Another object of this invention is to provide a process for the conversion of polymers of heterocyclic nitrogen-containing materials to valuable products. Still another object of this invention is to provide an improved dehydrogenation process which is more efficient wherein polymer by-product from said process is converted to additional valuable products for use in the process. Another object of this invention is to provide an improved process for the dehydrogenation of methylethylpyridine to methylvinylpyridine.

Other aspects, objects, and the several advantages of the invention are apparent from a study of the disclosure, the drawing and the appended claims.

In accordance with the present invention, a novel process is provided for the preparation of valuable products from polymers of a polymerizable heterocyclic nitrogen-containing base which comprises heating a polymer of said base at an elevated temperature for a time sufficient to depolymerize said polymer to monomeric products and recovering said monomeric products as products of the process. We have discovered that, by subjecting a polymer of certain polymerizable heterocyclic nitrogen-containing bases to pyrolysis within a temperature range of about 250 to about 600° C., and preferably at subatmospheric pressure, substantially all of the polymer is converted into monomeric products.

More specifically, in accordance with the present invention, a novel process is provided for the production of heterocyclic nitrogen bases of the pyridine, quinoline, and isoquinoline series by pyrolysis which comprises heating a polymer of one of said bases to a temperature of about 250 to about 600° C., preferably at subatmospheric pressure, and for a time sufficient to convert substantially all of said polymer to heterocyclic nitrogen bases of the pyridine, quinoline, and isoquinoline series and recovering said bases as a product of the process.

In accordance with a specific embodiment of the present invention, an improved process for the dehydrogenation of alkylpyridines to alkenylpyridines is provided which comprises heating an alkylpyridine containing feed stream, separating polymer from said heated stream, subjecting said alkylpyridine to dehydrogenation, separating said dehydrogenation effluent into an alkenylpyridine product, unreacted alkylpyridine recycle, and additional polymer, combining said separated polymer streams and heating the polymer to a temperature within the range of about 250 to about 600° C. at subatmospheric pressure to convert said polymer to alkyl and alkenyl substituted pyridines, and recovering said alkyl and alkenyl pyridines as products of the process, thereby materially increasing the yield of desired dehydrogenated pyridine.

Polymeric materials which can be advantageously processed, according to the practice of the present invention, comprise the liquid and solid polymers of one or more polymerizable monomers of the heterocyclic nitrogen bases of the pyridine, quinoline and isoquinoline series represented by the structural formulas

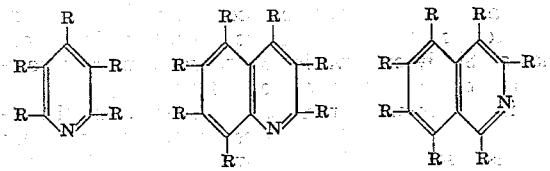

wherein R is selected from the group consisting of hydrogen, alkyl, vinyl, and alpha-methylvinyl groups, and wherein at least one of said groups being vinyl and alpha-methylvinyl, and the total number of carbon atoms in the alkyl groups does not exceed 12. Various alkyl substituted derivatives are also the precursors of these polymers, and for these the number of carbon atoms is not greater than 12 and, most frequently, are methyl and/or ethyl groups.

The heterocyclic nitrogen bases of the pyridine, quinoline, and isoquinoline series obtained as products, according to the practice of our invention, will be determined by the nature of the starting polymeric material. Typical liquid and solid polymers of the type described above which can be advantageously processed, according to this invention, include polymers of one or more of the following monomers.

2-vinylpyridine
2-methyl-5-vinylpyridine
2,3,4-trimethyl-5-vinylpyridine
3,4,5,6-tetramethyl-2-vinylpyridine
3-ethyl-5-vinylpyridine
2-isopropyl-4-nonyl-5-vniylpyridine
2,6-diethyl-4-vinylpyridine
2-methyl-5-undecyl-3-vinylpyridine
3-dodecyl-5-vinylpyridine
2-decyl-5(alpha-methylvinyl)pyridine
2-vinylquinoline
2-methyl-5-vinylquinoline
2-methyl-3-vinylquinoline
2-methyl-4-vinylquinoline
2,3,4-trimethyl-5-vinylquinoline
1-vinylisoquinoline
3-vinyl-6-methylisoquinoline and the like.

The reaction temperature for the present process will usually be in the range from about 250 to 600° C. The rate of depolymerization of the polymers treated according to the present invention varies directly with the temperature. Therefore, to obtain complete or essentially complete depolymerization of the materials at lower temperatures, for example, 250 to 400° C., a longer heating period is required than at the higher temperatures, for example, 500 to 600° C. The total reaction period of the present process will be in the range from about 0.01 to about 100 hours. Pyrolysis of the polymeric material is preferably effected under subatmospheric pressure, that is, at pressures below 1 atmosphere, such as pressures of the order of 1 mm. Hg, or lower, so as to facilitate rapid removal of the volatile products from the depolymerization zone. However, if desired, atmospheric and higher pressures, for example, pressures of 100 atmospheres and higher pressures can be employed. The volatile products in the depolymerization zone can be, if desired, swept from the depolymerization zone by the use of an inert gas, such as steam or nitrogen.

Polymeric materials which can be depolymerized, according to the practice of the present invention, can be passed to the depolymerization zone, mixed with a suitable diluent or solvent. Suitable diluents or solvents include and monomeric vinylpyridines and the alkylvinylpyridines. Diluents or solvents employed are preferably materials that can be readily separated from the vinyl-pyridines produced in the depolymerization zone by distillation. For example, 2-methyl-5-ethylpyridine can be advantageously employed.

A better understanding of this invention will be obtained by reference to the accompanying drawing wherein polymers formed in the process of preparing methylvinyl-pyridine from methylethylpyridine are passed to a depolymerization zone and converted to additional pyridines for use in the dehydrogenation process.

Referring now to the drawing, a feed stream comprising 2-methyl-5-ethylpyridine (MEP) is passed to surge tank 10 by way of conduit 11. Recycle MEP is introduced into surge tank 10 by way of conduit 12. The MEP feed is removed from surge tank 10 by way of conduit 13 and passed to furnace 14 wherein it is heated to a temperature of about 270° C. The heated feed is removed from furnace 14 by way of conduit 15 and introduced into flash zone 16 wherein vaporized MEP is removed overhead through conduit 17. A high boiling liquid and solid polymer mixture, such as resulting from the thermal polymerization of 2-methyl-5-vinylpyridine and 3-vinylpyridine, is removed from flash zone 16 by way of conduit 18.

The high boiling mixture removed from flash zone 16 by way of conduit 18 is introduced into steam stripping zone 19 wherein MEP is removed overhead by way of conduit 20 and mixed with MEP in conduit 17. Steam is introduced into the base of zone 19 by conduit 21. Stripped polymers are removed from the base of zone 19 by way of conduit 22 for further processing to be described hereinafter. Vaporized MEP removed from zone 16 and zone 19 at a temperature of about 270° C. and about 30 p.s.i.a. is admixed with superheated steam in conduit 23. Superheated steam is introduced by way of conduit 24 in a ratio of about 3.5:1 to about 7.0:1 pounds of steam per pound of MEP. Steam introduced by way of conduit 24 is sufficiently superheated that the feed mixture passed to dehydrogenation zone 25 is at a temperature of about 650° C.

In zone 25, MEP is dehydrogenated to MVP preferably in the presence of a catalyst which contains 93 weight percent $Fe_2O_3$, 5 weight percent $Cr_2O_3$ and 2 percent KOH. Pressures employed in zone 25 are generally in the range of 100 mm. mercury pressure absolute to 25 p.s.i.g. The flow rates in zone 25 range from 0.2 to 5 liquid volumes pyridine charge per volume of catalyst per hour, which corresponds to approximately 35 to 850 volumes gaseous alkylpyridine (calculated at standard temperature and pressure per volume of catalyst per hour).

The effluent from dehydrogenation zone 25 is removed by way of conduit 26 and cooled to about 200° C. in heat exchanger 27, and then quenched to about 65° C. in zone 28. A quenching medium is introduced into zone 28 by way of conduit 29. The cooled and liquefied dehydrogenation effluent removed from zone 28 is passed by way of conduit 30 to phase separator 31. In phase separator 31, the mixture is separated into an aqueous and organic phase, the aqueous phase being removed by way of conduit 32. Off gas comprising mainly hydrogen and other inert gases is removed from separator 31 by way of conduit 33.

The organic phase separated in separator 31 is passed to surge tank 35 by way of pipe 34. A mixture of predominantly MEP and MVP is passed through line 37 to fractionation column 38. The latter may be of any conventional type capable of providing countercurrent contact of liquid and vapors with reflux. Superheated steam can be injected into the base of fractionation zone 38 by way of line 39.

Overhead vapors removed from zone 38 consisting of steam and organic vapors predominantly MEP by conduit 40 are condensed in condenser 41 and separated into an aqueous and organic phase accumulator 42. The water phase is removed from accumulator 42 by conduit 43. The organic layer is withdrawn through conduit 44 and divided into two streams, one portion being withdrawn through conduit 45 for MEP recovery, the other recycled through conduit 46 to fractionator 38 as reflux. Sulfur, not shown, can be added to the reflux as a polymerization inhibitor. The organic layer removed by conduit 45 is passed to fractionator 47 for separation into an overhead vinylpyridine stream, removed by conduit 48 and a bottoms MEP stream removed by conduit 12 and recycled to surge tank 10.

MVP and polymerized vinylpyridine and higher-boiling residual materials are removed from the base of fractionation zone 38 by conduit 50 and passed to flash zone 51. MVP product is removed from the top of zone 51 by way of conduit 52. Polymers of vinylpyridines and higher-boiling residual materials are removed from the base of flash zone 51 by conduit 53.

In accordance with the present invention, the polymers removed from the dehydrogenation process by conduits 22 and 53 are introduced into conduit 54, mixed with a suitable diluent, such as MEP, introduced by way of conduit 55 and passed to depolymerization zone 56. In depolymerization zone 56, the polymeric feed mixture is heated to a temperature within the range of about 250 to about 600° C., preferably at subatmospheric pressure, for sufficient time to depolymerize substantially all of said polymers and form a mixture of pyridine derivatives comprising 3-ethylpyridine, 2-picoline, 2,5-lutidine, MVP, MEP, and 3-vinylpyridine. The depolymerization zone effluent mixture of pyridine derivatives is moved from zone 56 by way of conduit 57 and passed preferably to separation zone 58 which can comprise a plurality of separation zones including fractionation, solvent extraction, and the like.

The pyridine derivative mixture obtained as depolymerization zone effluent passed to zone 58 is preferably separated into a plurality of individual component streams. MEP is removed from separation zone 58 by pipe 60 and passed to pipe 12 for recycle to dehydrogenation zone 25 along with MEP recovered from zone 47. MVP is removed from zone 58 by pipe 61 and combined with MVP in pipe 52 recovered from zone 51, thereby materially increasing the yield of dehydrogenated pyridine product recovered from the process. Other depolymerization products recovered from zone 58 include 3-ethylpyridine removed by pipe 62, 3-vinylpyridine removed by pipe 63, and 2-picoline and 2,5-lutidine removed by way of pipe 64. These products can be combined with the same products recovered from the dehydrogenation effluent or passed to separate places of separation or utilization, not shown. Diluent and polymeric material can be removed from zone 58 and recycled to zone 56 by way of conduit 59.

By operating according to the practice of the present invention, polymers present in the feed to a dehydrogenatable alkylpyridine dehydrogenator are advantageously separated prior to dehydrogenation. These polymers as well as polymers formed during and after dehydrogenation are depolymerized, as above described, and the products obtained are preferably combined with the same materials recovered from the dehydrogenation effluent. Also by operation according to the present invention, the alkenylpyridines from the depolymerization zone products are recovered without passing these materials through the dehydrogenation zone a second time thereby increasing the throughput capacity of the dehydrogenator. Further, by depolymerizing polymers, according to the practice of the present invention, as herein disclosed, there results an increase in the ultimate yield of the desired alkenylpyridine. Furthermore, the vinylpyridines resulting from the thermal depolymerization of the polymers are recovered without need for modification of the dehydrogenation process. Clearly, it can be seen that only the dehydrogenatable alkylpyridines are recycled through the dehydrogenation zone, as discussed above.

The following example will serve to illustrate the advantages of my invention and should not be construed to limit the invention unduly.

EXAMPLE

For this example, a kettle product, representing a polymer stream, such as removed by pipe 22 of the accompanying drawing, was employed. This kettle product comprises polymer contained in the 2-methyl-5-ethylpyridine stream which has been heated in zone 14 and arise principally from polymerization of 2-methyl-5-vinylpyridine and 3-vinylpyridine. This product was found to contain about 32 percent water and 3 percent volatile pyridines as determined by heating to 140° C. under high vacuum (less than 1 mm. mercury pressure) until no loss in weight occurred. The remainder, about 65 percent, represented high boiling polymers.

The kettle product described above was depolymerized by heating in a 32 mm. Pyrex tube which was 25 inches long. The tube was heated by two tube furnaces. Three thermocouples were spaced equally apart within the tube for measurement of the temperature. The tube was inclined slightly. The kettle product was diluted with 10 weight percent methylethylpyridine (based on polymer) and fed slowly into the tube which was initially preheated to a temperature between 262 and 496° C. while keeping the pressure between 10–19 mm. of mercury. The liquid products flowed from the tube into a flask; and volatile gases passed through a condenser connected to a second flask. Vapors not condensed in this second flask were passed through a Dry Ice trap. These condensed products were combined, and then flash distilled at 10 mm. mercury pressure. The maximum boiling point of the material which was distilled was 65° C. These products were analyzed.

*Table*

| Run [1] | A | B [5] |
|---|---|---|
| Charge: | | |
| Steam-stripper kettle product, grams | 87.3 | 238.5 |
| Added MEP, grams | 8.7 | 23.9 |
| Temperature, ° C. | 294–458 | 262–496 |
| Pressure, mm. Hg | 10–13 | 19 |
| Feed rate, grams/hr. total feed (approx.) | 32 | 115 |
| Effluent: | | |
| Total volatile pyridines, grams | 40.6 | 110.5 |
| Net volatile pyridines, grams [2] | 29.2 | 79.2 |
| Water, grams | 26.2 | 73.5 |
| Non-volatile residue, grams | 25.6 | 75.6 |
| Material balance, percent | 96.2 | 98.9 |
| Polymer cracked to volatile pyridines, wt. percent [3] | 48.7 | 51.1 |
| Composition of volatile pyridines, wt. percent: [4] | | |
| 3-ethylpyridine (3EP) | 0.2 | 0.3 |
| 2-picoline | 2.7 | 2.9 |
| 2,5-lutidine | 1.6 | 1.4 |
| 2-methyl-5-ethylpyridine (MEP) | 8.5 | 8.7 |
| 3-vinylpyridine (3VP) | 64.0 | 65.3 |
| 2-methyl-5-vinylpyridine (MVP) | 23.1 | 21.6 |

[1] These were runs in which the feed was continuously added to the pyrolysis tube.
[2] Corrected for MEP added and volatile pyridines present in steam-stripper kettle product.
[3] Based on 65 per cent dry polymer present in the steam-stripper kettle product fed.
[4] Corrected for the MEP originally present in the steam-stripper kettle product and that which was added.
[5] On recycle of the non-volatile material from Run B, approximately 13 percent was cracked to give a pyrolysate containing 61.7 percent 3-vinylpyridine and 25.9 percent 2-methyl-5-vinylpyridine.

This table summarizes the pertinent data from two runs. These data show that 48.7 and 51.1 percent by weight of the polymer in the kettle product was cracked and recovered as volatile pyridines. For these runs, this pyridine fraction was found to comprise 64.0–65.3 percent by weight of 3-vinylpyridine and 21.6–23.1 percent by weight of 2-methyl-5-vinylpyridine. The alkylpyridines, principally 2-methyl-5-ethylpyridine, amount to 13.0–13.3 percent by weight of the cracked material. Thus, by depolymerizing the polymeric residue and recovering the volatile pyridines, as herein disclosed, there results an increase in the ultimate yield of the desired alkenylpyridine. Further, the vinylpyridines resulting from the thermal depolymerization of the polymer is recovered without need for modification of the process. Only the alkylpyridines are recycled through the dehydrogenation zone.

Reasonable variation and modification are possible within the scope of the foregoing disclosure, the drawing, and the appended claims to be invention, the essence of which is that an improved process has been provided for the production of aliphatic substituted pyridine, quinoline, and isoquinoline components by depolymerization which comprises heating a polymer formed by polymerization of a polymerizable vinylpyridine, vinylquinoline, and vinylisoquinoline mixed with a diluent or solvent, if desired, to an elevated temperature, such as a temperature within the range of about 250 to about 600° C., preferably at subatmospheric pressure, and for a time sufficient to convert substantially all of said polymer to heterocyclic nitrogen bases of the pyridine, quinoline, and isoquinoline series and recovering said bases as products of the process.

We claim:

1. An improved process for the conversion of 2-methyl-5-ethylpyridine to 2-methyl-5-vinylpyridine by dehydrogenation which comprises heating said 2-methyl-5-ethylpyridine, separating polymeric materials from said heated 2-methyl-5-ethylpyridine, dehydrogenating said 2-methyl-5-ethylpyridine to 2-methyl-5-vinylpyridine, separating the dehydrogenation effluent into a vinylpyridine product, a 2-methyl-5-ethylpyridine recycle stream, and a 2-methyl-5-vinylpyridine product, and separating polymeric materials present in said effluent, the improvement comprising passing said separated polymeric material to a depolymerization zone, heating said polymers to a temperature in the range of about 250 to about 600° C. at subatmospheric pressure in said depolymerization zone for a sufficient time to convert substantially all of said polymer to simple pyridine derivatives, separating the various derivatives from said depolymerization zone effluent, recovering the alkenyl substituted products, returning dehydrogenatable pyridines to the dehydrogenation zone, and returning diluent and polymeric material to said depolymerization zone.

2. An improved process for the dehydrogenation of alkylpyridines to alkenylpyridines comprising heating a feed stream containing said alkyl pyridines, separating polymeric materials present in said feed stream from said feed stream, dehydrogenating the remainder of said feed stream in a first zone, passing the thus separated polymeric materials to a second zone, the feed to said second zone consisting essentially of polymeric materials, subjecting said polymeric materials to an elevated temperature in said second zone for a sufficient time to convert substantially all of said polymeric materials to monomeric products, converting substantially all of said polymeric materials in said second zone to monomeric products, and recovering said monomeric products thus produced.

3. An improved process for the dehydrogenation of alkylpyridines to alkenylpyridines comprising heating a feed stream containing said alkyl pyridines, separating polymeric materials present in said feed stream from said feed stream, dehydrogenating the remainder of said feed stream in a first zone, separating polymeric materials from the dehydrogenation effluent, separating said dehydrogenation effluent into an alkenylpyridine product and an alkylpyridine recycle stream, passing the thus separated polymeric materials to a second zone, the feed to said second zone consisting essentially of polymeric materials, subjecting said polymeric materials to an elevated temperature in said second zone for a sufficient time to convert substantially all of said polymeric materials to monomeric products, converting substantially all of said polymeric materials in said second zone to monomeric products, separating the various monomeric products from the effluent from said second zone, recovering the alkenyl substituted products, returning dehydrogenatable pyridines to said first zone, and returning polymeric materials to said second zone.

4. A process according to claim 2 wherein said elevated temperature is in the range of about 250° C. to about 600° C.

5. A process according to claim 2 wherein said alkyl pyridine is 2-methyl-5-ethylpyridine and said alkenyl pyridine is 2-methyl-5-vinylpyridine.

6. An improved process for the dehydrogenation of alkyl pyridines to alkenyl pyridines comprising heating a feed stream containing said alkyl pyridines in a first zone, dehydrogenating the heated feed stream in a second zone, separating polymeric materials from the dehydrogenation effluent, passing the thus separated polymeric materials to a third zone, the feed to said zone consisting essentially of polymeric materials, subjecting said polymeric materials to an elevated temperature in said third zone for a sufficient time to convert substantially all of said polymeric materials to monomeric products, converting substantially all of said polymeric materials in said third zone to monomeric products, separating the various monomeric products from the effluent from said third zone, recovering the alkenyl substituted products, and returning only dehydrogenatable pyridines to said second zone.

References Cited in the file of this patent

UNITED STATES PATENTS 2,732,376    Wagner                Jan. 24, 1956

OTHER REFERENCES

Hurd: "Pyrolysis of Carbon Compounds," pp. 745–748 (1929), (Chem. Catalog Co.).

UNITED STATES PATENT OFFICE

CERTIFICATE OF CORRECTION

Patent No. 2,996,509                          August 15, 1961.

Stanley D. Turk et al.

It is hereby certified that error appears in the above numbered patent requiring correction and that the said Letters Patent should read as corrected below.

Column 7, line 32, for "polymers" read -- polymeric material --; lines 35 and 36, for "polymer" read -- polymeric material --.

Signed and sealed this 20th day of February 1962.

(SEAL)
Attest:

ERNEST W. SWIDER
Attesting Officer

DAVID L. LADD
Commissioner of Patents